Figures 1, 2:
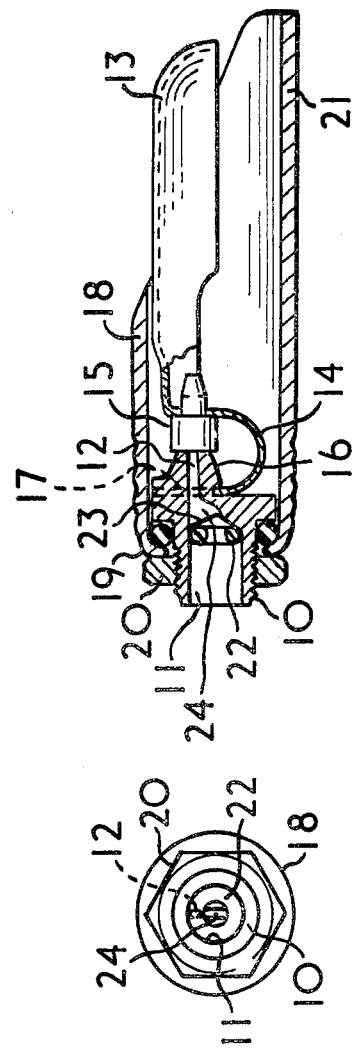

United States Patent [19]
Restall

[11] 3,889,640
[45] June 17, 1975

[54] ANIMAL OPERATED LIQUID DISPENSER

[76] Inventor: George Restall, 27 Little Aston Ln., Sutton Coldfield, England

[22] Filed: Oct. 1, 1973

[21] Appl. No.: 402,053

[30] Foreign Application Priority Data
Oct. 10, 1972 United Kingdom............... 46554/72

[52] U.S. Cl. .................................................. 119/75
[51] Int. Cl............................................. A01k 7/00
[58] Field of Search .................... 119/75, 76, 79, 80; 222/518, 494, 547, 545; 251/118; 138/45

[56] References Cited
UNITED STATES PATENTS

| | | | |
|---|---|---|---|
| 1,558,709 | 10/1925 | Nenstiehl | 222/494 |
| 2,568,519 | 9/1951 | Smith | 138/45 |
| 3,179,085 | 4/1965 | McKillip, Jr. | 119/75 |
| 3,428,028 | 2/1969 | Hart | 119/75 |
| 3,611,999 | 10/1971 | Hey | 119/75 X |
| 3,613,642 | 10/1971 | Restall | 119/75 |

Primary Examiner—Stanley H. Tollberg
Assistant Examiner—Norman L. Stack, Jr.
Attorney, Agent, or Firm—Kenway & Jenney

[57] ABSTRACT

A liquid dispenser for dispensing liquid to animals and including a body member having an aperture through which flows the liquid to be dispensed, the aperture being closable by a valve closure element carried on a leaf spring which is mounted on the body member and urges the closure element to close the aperture. An operating member is operable by an animal to move the closure element to open the aperture to allow flow of the liquid to take place.

10 Claims, 2 Drawing Figures

ANIMAL OPERATED LIQUID DISPENSER

This invention relates to liquid dispensers for animals and of the kind capable of connection to a supply of liquid to be dispensed and comprising a body member, a valve arrangement including an aperture formed in the body member and closable by a valve closure element and an operating member arranged to move the valve closure element from a valve closing towards a valve opening position. Such liquid dispensers will hereinafter be referred to as being "of the kind described."

The present invention consists in a liquid dispenser for animals, of the kind described and including a leaf spring arranged to urge the closure element towards the valve closing position.

Preferably the valve closure element is arranged to engage and close the downstream end of the aperture when in the valve closing position.

Preferably the closure element is secured to and carried by the leaf spring and preferably the leaf spring is secured to and carried by the body member. Preferably the operating member extends from and is supported by the leaf spring, the arrangement being such that deflection of the operating member deflects the leaf spring and thus moves the valve closure element towards the valve opening position. Preferably the leaf spring and the operating member are integral.

A housing of tubular form may surround the body member and extend downstream at least so far as to surround an upstream end portion of the operating member. A chute along which dispensed liquid can flow into an animal's mouth extends from the downstream end of the housing to the vicinity of the downstream end of the operating member.

The dispenser is intended to be capable of application not only for dispensing liquid from a supply at high pressure but also where the supply of liquid is at a low pressure. Thus the cross-sectional area of flow of the aperture is selected to be great enough to permit an adequate flow of liquid from the low pressure supply. However the spring rate of the leaf spring must be selected so that the leaf spring can effect closure of the aperture when the dispenser is applied to the high pressure supply. The dimensions of the operating member and in particular the length of lever it provides for the movement of the valve closure member can then be determined, taking into consideration that it may be a requirement for the dispenser that relatively weak animals, e.g., young animals, must be able to operate the dispenser. There may be a problem in that as the cross-sectional area of flow through the aperture is such as to provide adequate flow from low pressure supplies, when connected to a high pressure supply the flow of liquid may be too great and consequently result in wastage. To overcome this problem a flow restricting valve may be provided of a kind which in effect will throttle liquid supplied at a high pressure to more of the order of pressure for which the cross-sectional area of flow of the aperture was selected.

An embodiment of the invention will now be described by way of example only, with reference to the accompanying drawings in which:

FIG. 1 is a cross-sectional side elevation of a dispenser according to the present invention; and FIG. 2 is an end view of the dispenser shown in FIG. 1.

In this specification the terms "upstream" and "downstream" are employed to refer respectively to the left and right-hand side of the dispenser as shown in FIG. 1.

The dispenser comprises a body member 10 of circular cross-section along the axis of which is formed a bore 11. Through the downstream end wall of member 10 is an aperture 12 leading downstream from the bore 11 to the outside of the member 10.

An operating member 13 is of generally U-shaped cross-section and has its downstream end of domed shape. At the upstream end of the operating member 13 is a leaf spring 14 of U-shaped configuration. The operating member 13 and the leaf spring 14 are formed from a single piece of resilient and hygienic material such as a spring stainless steel of which an example is steel made to specification EN58a. One arm of the leaf spring 14 is integral at its end with the upstream end of the operating member 13. This one arm of the leaf spring 14 is apertured and carries a valve closure element 15 in the form of a pad with an integral spigot portion extending through and secured in the aperture in the one arm of the leaf spring 14. The other arm of the leaf spring 14, that is to say the free arm, is bifurcated and is secured to the body member 10. The body member 10 has a nozzle portion 16 projecting from its downstream end wall, the aperture extending through this portion 16. Adjacent to the face of the end wall of the body member 10 the portion 16 is formed with a rebate 17. The bifurcated end of the other arm of the leaf spring 14 engages in the rebate 17 so that this arm of the leaf spring 14 lies against the downstream face of the body member 10 and is secured in that position by the engagement.

A housing 18 is secured to the body member 10. At its upstream end the outer surface of the housing is screw-threaded to enable it to be screwed into the end of a liquid supply pipe. The housing is of generally tubular configuration but having at its upstream end an inwardly directed flange 19 by means of which the housing is secured to the body member 10. The body member 10 has a reduced diameter portion at its upstream end which is screw-threaded and is disposed in the housing with the screw-threaded portion projecting through the flange. A seal is disposed on the screw-threaded portion of the body member 10 between the flange on the housing 18 and an annular shoulder on the body member 10 and is secured in place by a nut 20. The housing encloses and surrounds the upstream end of the operating member 13, but the downstream end portion of the operating member 13 projects clear of the housing 18. The housing 18 is continued as a chute the wall of the housing 18 being formed as though it was cut away obliquely.

In use an animal grips the underside of the chute 21 and the operating member 13 and squeezes them together. The consequent movement of the operating member 13 moves the valve closure element 15 from the aperture 12 against the force exerted by the leaf spring 14 and allows liquid to flow out of the bore 11 through the aperture 12 into the housing from where it flows down the chute 21 into the animal's mouth. When the operating member is released the leaf spring effects closing of the aperture by the element 15.

As previously discussed in this specification, it may be a requirement for a dispenser, as so far specifically described herein, to be used with a supply of liquid at high pressure although its aperture 12 has a cross-sectional area of flow selected to be large enough to permit adequate flow from a supply of liquid at a low pressure. For this purpose a flow restricting valve is provided. This valve comprises a ring 22 of resilient material disposed against an upstream face 23 of the end wall of the body member 10. As can be seen in FIG. 1 the aperture is offset relative to the bore 11. The end wall is formed with a groove 24 enabling liquid to flow into the aperture from the middle of the face of the end wall. The face is of conical shape of a cone angle such that the ring 22 is moved progressively downstream longitudinally of the bore 11 as the pressure of the supply is increased thus being compressed by the conical face so that in turn its internal diameter is reduced, thus throttling the flow. This valve enables the dispenser to be connected to a supply at any pressure and acts when flow occurs to reduce the pressure of the flowing liquid to a valve not significantly different from the value of pressure of the supply for which the cross-sectional area of flow through the aperture was selected.

The operating member 13, the leaf spring 14, the closure element 15 and the body member 10 are all connected together so that is servicing is required on site this assembly can be removed without any fear of dropping and losing any part.

I claim:

1. A liquid dispenser for animals comprising means of connection to a supply of liquid to be dispensed, a body member, a valve arrangement including an aperture defined in said body member, a valve closure element for closing said aperture at its downstream end, a leaf spring secured to said body member and carrying said valve closure element so as to urge said element towards its valve closing position, and an operating member arranged to move said closure element from a valve closing towards a valve opening position.

2. A liquid dispenser as claimed in claim 1 wherein said operating member extends from and is supported by said leaf spring.

3. A liquid dispenser as claimed in claim 1 and including a housing to which is secured said body member, said housing surrounding said body member and extending downstream at least so far as to surround an upstream end portion of said operating member.

4. A liquid dispenser as claimed in claim 3 and including a chute along which dispensed liquid can flow into an animal's mouth, said chute extending from the downstream end of said housing.

5. A liquid dispenser as claimed in claim 1 and comprising a flow restricting valve arranged to throttle liquid flowing through said dispenser.

6. A liquid dispenser as claimed in claim 5 wherein said flow restricting valve comprises a resiliently deformable member and wherein said body member defines a passage through which said liquid flows and in which said deformable member is disposed whereby said deformable member deforms in response to pressure exerted upon it by said liquid when flowing and restricts said passage.

7. A liquid dispenser as claimed in claim 6 wherein said deformable member is an O-ring and wherein said body member includes in said passage a tapered seat against which said O-ring seats.

8. A liquid dispenser for animals comprising means of connection to a supply of liquid to be dispensed, a body member, a valve closure element for closing said aperture at its downstream end, a leaf spring of generally U-shaped configuration thus having two arms, said body member having a rebate and one of said two arms of said leaf spring being bifurcated and engaged in said rebate to secure said leaf spring to said body member, the other of said two arms carrying said valve closure element, said leaf spring being arranged to urge said valve closure element to its valve closing position, and an operating member arranged to move said closure element from a valve closing towards a valve opening position.

9. A liquid dispenser as claimed in claim 8 wherein the body member has a downstream face and a nozzle portion projecting from said downstream face, said rebate being formed in said nozzle portion adjacent said downstream face.

10. A liquid dispenser as claimed in claim 8 wherein said operating member is integral with said leaf spring and extends from said other of said two arms of said leaf spring.

* * * * *